United States Patent [19]

Bachhofer et al.

[11] Patent Number: 4,798,669
[45] Date of Patent: Jan. 17, 1989

[54] SYSTEM FOR TREATING WATER WITH OZONE

[76] Inventors: Bruno Bachhofer, Saentisstrasse 86; Anton Locher, Bergstrasse 6, both of 7980 Ravensburg 1, Fed. Rep. of Germany

[21] Appl. No.: 141,867

[22] Filed: Jan. 11, 1988

[30] Foreign Application Priority Data

Apr. 4, 1987 [DE] Fed. Rep. of Germany ....... 3711407

[51] Int. Cl.⁴ ............................................. C02F 1/78
[52] U.S. Cl. .................................. 210/109; 210/108; 210/121; 210/192; 210/199; 210/760; 210/203; 210/284
[58] Field of Search ............... 210/760, 108, 109, 192, 210/199, 203, 205, 275, 284, 121

[56] References Cited

U.S. PATENT DOCUMENTS

| | | | |
|---|---|---|---|
| 3,445,001 | 5/1969 | Raus | 210/192 |
| 3,680,701 | 8/1972 | Holca | 210/284 X |
| 4,145,279 | 3/1979 | Selby | 210/108 X |
| 4,178,239 | 12/1979 | Lowther | 210/760 X |
| 4,250,040 | 2/1981 | LaRaus | 210/760 |
| 4,652,370 | 3/1987 | Bachhofer et al. | 210/192 |
| 4,696,739 | 9/1987 | Pedneault | 210/121 |

FOREIGN PATENT DOCUMENTS

| | | |
|---|---|---|
| 2231025 | 2/1973 | Fed. Rep. of Germany . |
| 2511499 | 9/1976 | Fed. Rep. of Germany . |
| 1366594 | 9/1974 | United Kingdom . |

Primary Examiner—Charles Hart
Attorney, Agent, or Firm—Spencer & Frank

[57] ABSTRACT

A water treatment system having an apparatus (2) for the intensive pretreatment of the untreated water with ozone, having a downstream filter (3) with reducing action, and also having an apparatus (4) for the post-disinfection is improved in that the excess ozone which accumulates in the upper part (17) of the filter tank and which is added to the water during the pretreatment is removed anhydrously and fed into the apparatus for the post-treatment of the filtered water. The post-treatment takes place preferably in a retention vessel (4) filled with packing material (15) in which the water comes into contact with ozone by surface contact. The water level (24) is kept constant by regulating the gas discharge from the retention vessel (4). (Illustrated by drawing).

5 Claims, 1 Drawing Sheet

U.S. Patent   Jan. 17, 1989   4,798,669
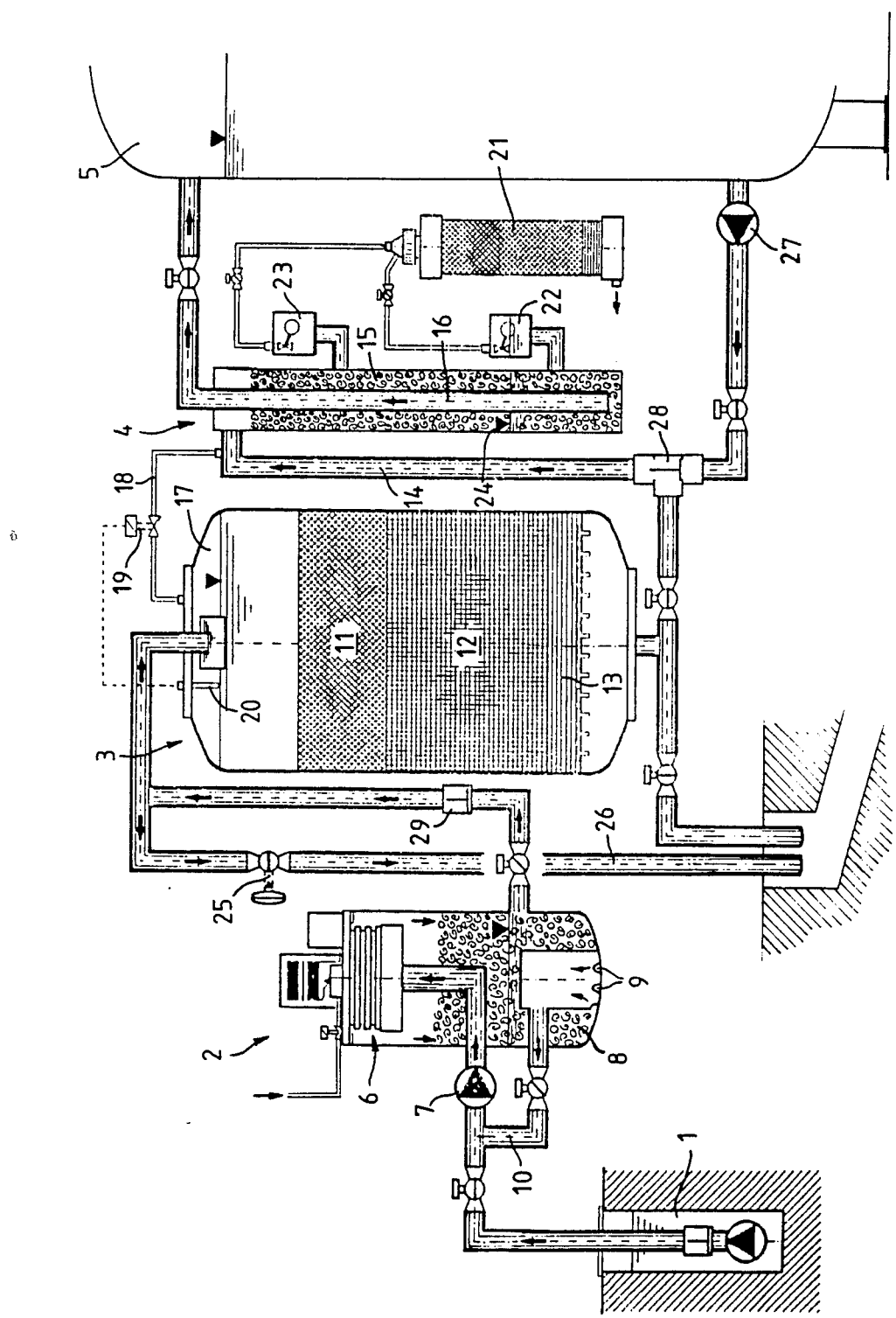

SYSTEM FOR TREATING WATER WITH OZONE

DESCRIPTION

The invention relates to a water treatment system having an apparatus for the intensive pretreatment of untreated water with ozone, having a filter downstream comprising a filter tank, partly filled with filter materials having a reducing action, through which the pretreated water flows from top to bottom, in which process the residual ozone contained in the water is decomposed, and having an apparatus for the post-treatment of the water with ozone for the purpose of post-disinfection.

A preferred field of application of the invention is drinking water treatment, i.e. the treatment of organically and biologically contaminated water, for example groundwater collected near the surface of the ground, to produce water which can be drunk by human beings.

Subjecting organically and biologically contaminated water to an intensive oxidation with ozone for the purpose of improving the quality is known. Depending on the degree of contamination, repeating this treatment of the untreated water several times by circulating the water in a loop is also known. This intensive ozone treatment produces the result through oxidation that viruses are inactivated, bacteria are killed, organic substances are reduced to subsidiary products, and also colloids are caused to coagulate and consequently rendered capable of being filtered.

If the untreated water contains manganese, in particular in the form of brown manganese oxides, the latter are oxidized at high ozone concentration to permanganates which are soluble and cannot therefore be filtered out.

The use of filters with reducing action, e.g. mixed bed filters which largely consist of coked coal of varied granulation, for the pretreated water is further known. In this case, the ozone present in the water is completely removed, and the dissolved permanganate is reduced to manganese oxides which, just like the filterable organic constituents, are retained. However, it has already always been observed that, in the deeper filter layers, bacteria colonies are formed from which microbes are occasionally flushed out with the pure water. Post-disinfection was therefore used as a prophylactic measure but an attempt was made to mineralize the organic substances as much as possible by an all the more intensive preoxidation.

New discoveries have shown that it is more advantageous not to push the oxidation in the pretreatment stage too far so that assimilatable organic substances, i.e. substances suitable as nutrient for bacteria, are produced on a larger scale. As a result of this, there is formed in the reductively constructed filter bed an aerobic bacterial growth which is adapted to these assimilatable substances and which in turn produces a more extensive mineralization and, consequently, reduction of the organic substances. In this case the ozone in the pretreatment stage is comparable to a tool which only opens up the organic substances to render them suitable for the biological conversion in the filter bed. The pretreatment consequently requires less ozone.

On the other hand, the post-disinfection acquires increased significance. It is to be understood as an operational disinfection. It inevitably eliminates the microbes possibly originating from the biomass and makes it possible to establish a residual oxygen content in the pure water which is necessary for the more extensive protection of hygiene.

The invention is based on the object of proposing a particularly simple and effective system of water treatment which functions in this manner, which is economical to operate and which makes optimum use of the ozone produced.

This object is achieved according to the invention on the basis of a water treatment system of the type described in the introduction, wherein the excess ozone which accumulates in the upper part of the filter tank and is added to the water during the pretreatment is fed anhydrously into the apparatus for the post-treatment of the filtered water.

Although only one ozone generator is provided according to this proposal, ozonized gas with different ozone concentration is made available at two points without a pipeline system and without ozone loss, the ozone concentration corresponding to the particular requirement. As high an ozone concentration as possible is necessary for the ozone pretreatment since the untreated water is heavily contaminated with organic substances. A low ozone concentration is, on the other hand, adequate for the post-treatment since the filtered water is almost clean and, consequently, uses up only a small amount of ozone. The use of all the generated ozone of high concentration for the pretreatment covers the requirement at this point, while the residual ozone of low concentration, which accumulates in the upper part of the filter tank is adequate for the post-disinfection.

The invention is of particular practical importance if the ozone generator is immersed in the process water as a result of the construction and forms a structural unit with a mixer, all the generated ozone gas being introduced directly into the water. In this case there would be considerable difficulties in tapping off a part of the ozone for the post-disinfection, quite apart from the ozone losses due to decomposition in the length of pipe. According to the invention, on the other hand, the ozone excess present in any case is utilized for the post-disinfection.

The excess ozone should be removed from the upper part of the filter tank anhydrously, i.e. separated from water, and if necessary, mixed with air. This is necessary because the contamination constituents retained by the filter accumulate at the removal point and, consequently, the water is heavily contaminated. The removal of anhydrous gas is achieved by a system wherein, at the top of the filter tank, a removal pipe is connected for the ozone-containing air located there and wherein a level probe which shuts off the removal pipe by means of a regulating valve if the water level rises above a certain limit value is incorporated in the filter tank.

This ensures that a gas cushion of adequate height continues to be maintained in the filter tank and no contaminated water can enter the removal pipe.

A system is proposed wherein, as apparatus for the post-treatment of the filtered water, an elongated retention vessel is provided which is filled with chemically resistant packing material having a small volume and a large surface and wherein the filtered water is introduced into the retention vessel at the top and removed at the bottom so that it trickles over the packing material and the ozone-containing air is introduced into the retention vessel and the exhaust air is removed via an active charcoal filter. The ozone-air mixture can be introduced directly into the retention vessel or shortly beforehand into the pure water which flows or is preferably sprayed into the retention vessel at the top so that as long a residence time as possible in the ozone-containing air results. For the same reason, the water level in the retention vessel is kept constant by means of a level regulating valve which shuts off the exhaust air pipe from a certain water level upwards.

A further object of the invention is to circulate the untreated water in the pretreatment apparatus several times and to transfer the excess ozone-air mixture introduced to the filter tank. This is expediently achieved by a system wherein the apparatus for the pretreatment of the untreated water comprises a reaction vessel which has a mixer in the upper part and, about half way up, an outlet for the water-ozone-air mixture flowing to the filter tank, while the water from the bottom of the reaction vessel flows via a return branch to a circulating pump feeding into the mixer. During operation, a gas blanket develops in the reaction vessel down to the outlet connection pipe and excess gas is entrained by the water flowing out to the filter.

An exemplary embodiment of the invention is explained in more detail below by reference to the diagram of a drinking water treatment system shown in the only FIGURE.

The untreated water is removed from a well (1), fed to a pretreatment apparatus (2), filtered in a mixed-bed filter (3), post-treated in a packed column (4) and then collected in a storage tank (5).

The pretreatment apparatus (2) contains an ozone generator and a ozone/water mixing chamber which are combined in one module (6). The continuously adjustable ozone generator delivers up to 55 g of ozone per hour. The achievable ozone concentration in the gas phase before introduction into the water is up to 50 g of ozone per normal cubic meter of air. The ozone generator is constructed in a stack structure of horizontal plates and is suspended on the cover of the reaction vessel. The mixing apparatus is located beneath it.

The reaction vessel is largely filled with packing material (8) which has been punched from stainless steel sheet and crumpled together to produce a spherical external shape of about 5 cm diameter. About half way up this layer of packing material there is situated, on the casing of the reaction vessel, an outlet connecting pipe from which a pipe leads to the mixed-bed filter (3). A circulating pump (7) forces the untreated water from below into the module (6), at the circumference of which it emerges again. The water then sinks dwwnwards through the layer of packing material (8) and passes through cutouts (9) at the lower edge of an inner cylinder, from which point it is returned again to the circulating pump (7) by a return branch (10). The delivered output of the circulating pump (7) remains constant. The throughput of the pretreatment apparatus is determined by the delivered output of the pump in the well (1) and by the setting of the throttle valves which are disposed upstream and downstream of the pretreatment apparatus.

The ozone-containing air added to the circulated water in the module (6) allows the water level in the reaction vessel to sink roughly to the height of the outlet connecting pipe during operation. Further gas is entrained by the outlet pipe to the filter (3). The throughput of the pretreatment apparatus and the ozone output are so adjusted that the desired pure water quality is achieved with the available untreated water quality being taken into account. If the untreated water quality varies, the redox potential of the pure water can be registered metrologically and regulated to a certain value by altering the throughput and/or the ozone generator output.

The upper filter layer (11) of the mixed-bed filter (3) comprises a mixture of granular material of different types of coked coal having a particle size of 0.8 to 1.6 mm. The middle filter layer (12) comprises a quartz sand having a particle size of 0.3 to 0.8 mm, and a further layer of coarse gravel (13) is disposed above the bottom of the filter. The inclusion of coking coal produces the necessary reducing environment for removing ozone completely, reducing permanganates back to filterable manganese oxides and making possible a permanent growth of aerobic bacteria.

After being filtered, the water is fed via a pipe (14) into the packed column (4). Here it trickles over a layer (15) of packing material of the same type as the packing material (8) of the pretreatment apparatus (2). From the lower part of the packed column (4), the water is forced upwards via a riser (16) and then fed to the storage container (5).

As a consequence of the low flow velocity in the mixed-bed filter (3), a blanket of excess ozone-air mixture (17) of low ozone concentration forms in the upper part thereof. This gas is introduced via a connecting pipe (18) into the pipe (14) shortly upstream of the packed column (4) and is then introduced into the upper part of the packed column (4) together with the water. The water level in the mixed-bed filter (3) is kept constant by influencing a regulating valve (19) contained in the pipe (18) by means of a level probe (20) so that no contaminated water can infiltrate into the pipe (18).

The exhaust gas from the packed column (4) is fed through an active charcoal filter (21) which completely removes the ozone contained in the gas to form carbon dioxide. The gas discharge can be so regulated by means of a float valve (22) that the water level (24) in the packed column (4) is kept constant at the height drawn. With this low water level, the trickling path and, accordingly, the contact time between water and ozone are relatively long. Optionally, instead of the float valve (22), a more highly disposed float valve (23) can be put into operation. As a result of this, the water level is placed higher and the trickling path and contact time are shortened. Consequently, the effect of the ozone post-treatment can be coarsely adjusted by the choice of the water level. The fine adjustment takes place at the ozone generator.

To back-flush the mixed-bed filter (3), pure water is removed from the storage tank (5) and forced from the bottom upwards by means of a back-flushing pump (27) through the filter tank. For this purpose, the valve (25) in a pipe (26) leading from the upper connection of the mixed-bed filter (3) to the sewer is opened and a back-flushing pump (27) is put into operation. As a result of this, a 3-way valve (28) in the pipe (14) automatically switches over. A check valve (29) in the connecting pipe from the oxidation apparatus (2) to the mixed-bed filter (3) closes. As a result of this, the contaminants detached from the filter body discharge into the sewer through the pipe (26).

The water velocity during back-flushing should be adjusted with care, namely, so that, on the one hand, although the contaminants are detached and flushed out, the bacteria cultures adhering firmly to the coke particles remain largely intact so that the biological action of the filter can immediately start up again to the full extent when it is put into operation.

We claim:

1. Water treatment system having an apparatus for the intensive pretreatment of untreated water with ozone, having a filter downstream comprising a filter tank, partly filled with filter materials having a reducing action, through which the pretreated water flows from top to bottom, in which process the residual ozone contained in the water is decomposed, and having an apparatus for the post-treatment of the water with ozone for the purpose of post-disinfection, wherein the excess ozone which accumulates in the upper part (17) of the filter tank and which added to the water during the pretreatment is fed anhydrously into the apparatus for the post-treatment of the filtered water.

2. Water treatment system as claimed in claim 1, wherein a removal pipe (18) is connected at the top of the filter tank, for the ozone-containing air located there and wherein a level probe (20) which shuts off the removal pipe (18) by means of a regulating valve (19) if the water level rises above a certain limit value is incorporated in the filter tank.

3. Water treatment system as claimed in claim 2, wherein, as retention apparatus for the post-treatment of the filtered water, an elongated retention vessel (4) is provided which is filled with chemically resistant packing material (15) having a small volume and a large surface and wherein the filtered water is introduced into the retention vessel (4) at the top and is removed at the bottom so that it trickles over the packing material (15) and the ozone-containing air is introduced into the retention vessel (4) and the exhaust air is removed via an active charcoal filter (21).

4. Water treatment system as claimed in claim 3, wherein the water level (24) in the retention vessel (4) is kept constant by means of a level regulating valve (22) which shuts off the exhaust air pipe from a certain water level upwards.

5. Water treatment system as claimed in claim 1, wherein the apparatus (2) for the pretreatment of the untreated water comprises a reaction vessel which has a mixer in the upper part and, about half way up, an outlet for the water-ozone-air mixture flowing to the filter tank, while the water from the bottom of the reaction vessel flows via a return branch (10) to a circulating pump (7) feeding into the mixer.

* * * * *